United States Patent
Erben et al.

(10) Patent No.: US 12,030,011 B2
(45) Date of Patent: Jul. 9, 2024

(54) AIR SCRUBBER HAVING AN INTERIOR AIR EXHAUST

(71) Applicants: thyssenkrupp Industrial Solutions AG, Essen (DE); thyssenkrupp AG, Essen (DE)

(72) Inventors: Axel Erben, Dortmund (DE); Matthias Pieper, Unna (DE)

(73) Assignees: thyssenkrupp Uhde GmbH, Dortmund (DE); thyssenkrupp AG, Essen (DE)

( * ) Notice: Subject to any disclaimer, the term of this patent is extended or adjusted under 35 U.S.C. 154(b) by 114 days.

(21) Appl. No.: 17/419,500

(22) PCT Filed: Jan. 8, 2020

(86) PCT No.: PCT/EP2020/050274
§ 371 (c)(1),
(2) Date: Jun. 29, 2021

(87) PCT Pub. No.: WO2020/151946
PCT Pub. Date: Jul. 30, 2020

(65) Prior Publication Data
US 2022/0088530 A1    Mar. 24, 2022

(30) Foreign Application Priority Data
Jan. 21, 2019 (DE) .................... 10 2019 200 700.7

(51) Int. Cl.
*B01D 47/00* (2006.01)
*B01D 47/14* (2006.01)
(Continued)

(52) U.S. Cl.
CPC ............. *B01D 47/14* (2013.01); *B01D 53/18* (2013.01); *B01D 53/78* (2013.01); *B01D 2257/40* (2013.01)

(58) Field of Classification Search
CPC ........ B01D 47/14; B01D 53/18; B01D 53/78; B01F 23/214
See application file for complete search history.

(56) References Cited

U.S. PATENT DOCUMENTS 3,948,608 A * 4/1976 Weir, Jr. .............. B01D 53/501
261/36.1
4,487,748 A    12/1984 Onojima et al.

FOREIGN PATENT DOCUMENTS

CA     2810368 A1 *  4/2012  ............. B01D 53/62
CN     203725013 U    7/2014
(Continued)

OTHER PUBLICATIONS

English Translation of International Search Report issued in PCT/EP2020/050274, dated Mar. 2020.

*Primary Examiner* — Robert A Hopkins
(74) *Attorney, Agent, or Firm* — thyssenkrupp North America, LLC

(57) ABSTRACT

An exhaust air scrubber for removing dust, abraded product, and water-soluble constituents from process exhaust air may include in a single housing a cleaning stage that includes a droplet separator and a packing disposed below the droplet separator. The exhaust air scrubber may also include an inlet apparatus for process exhaust air disposed in a lower portion of the housing, a withdrawal apparatus for scrubbing solution, and a withdrawal conduit for cleaned exhaust air, with the withdrawal conduit beginning inside the housing above the cleaning stage, passing downward inside the housing, and passing out of the housing to an outside in the lower portion of the housing below the cleaning stage. The scrubber may further include a feed conduit for scrubbing solution in an upper portion of the housing above the cleaning stage.

19 Claims, 1 Drawing Sheet

(51) Int. Cl.
*B01D 53/18* (2006.01)
*B01D 53/78* (2006.01)
*B01F 23/21* (2022.01)

(56) References Cited

FOREIGN PATENT DOCUMENTS

| | | | | |
|---|---|---|---|---|
| CN | 204107330 U | | 1/2015 | |
| CN | 105236609 B | | 7/2017 | |
| CN | 112457891 A | * | 3/2021 | ......... B01D 53/1406 |
| DE | 2134585 B1 | | 1/1973 | |
| DE | 102008046820 A1 | | 3/2010 | |
| GB | 794060 A | | 4/1958 | |
| GB | 1528051 A | | 10/1978 | |
| JP | 2012187515 A | | 10/2012 | |
| SY | 1715386 A1 | * | 2/1992 | |
| WO | WO-03047724 A1 | * | 6/2003 | ............. B01D 47/00 |

\* cited by examiner

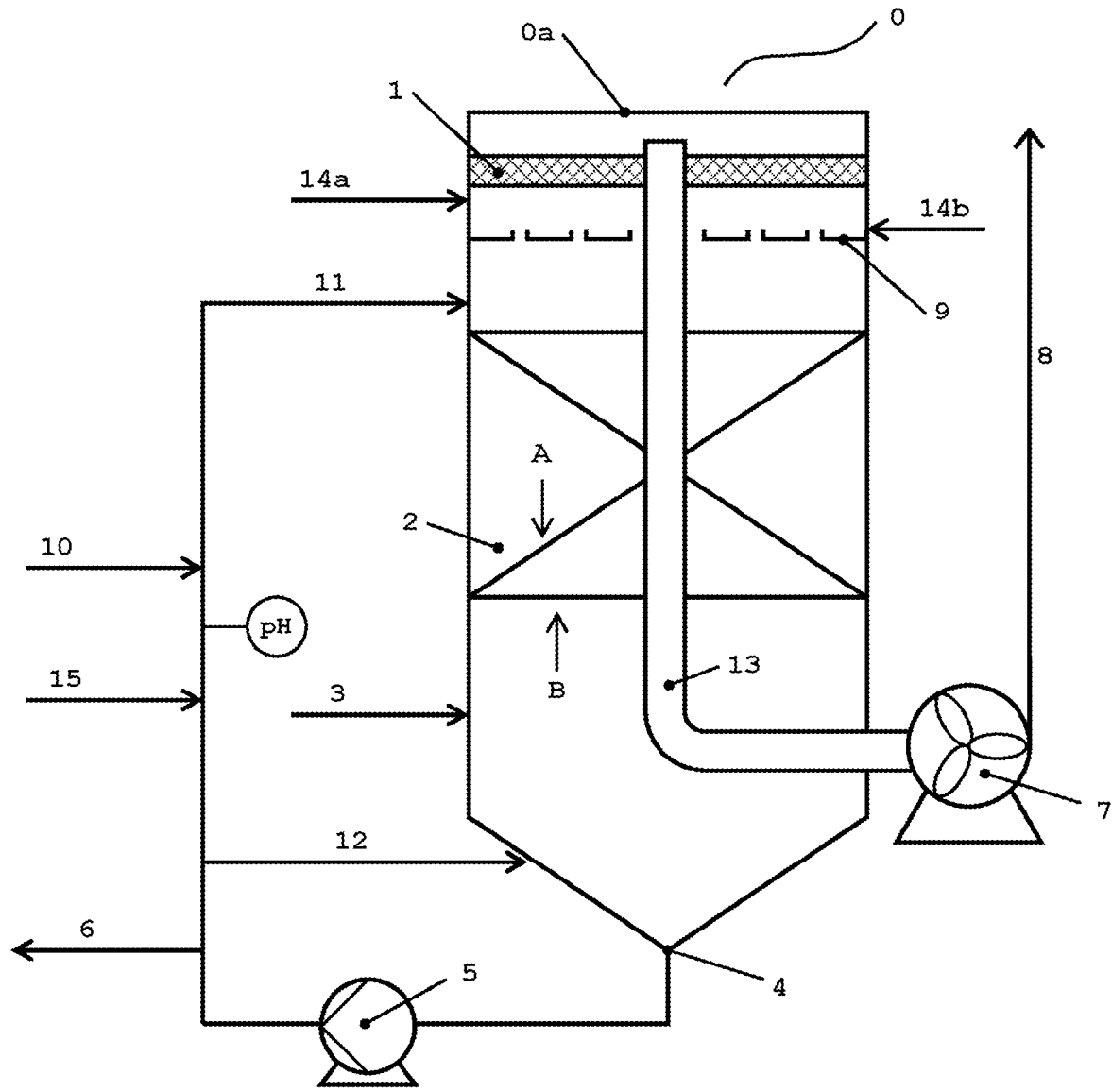

AIR SCRUBBER HAVING AN INTERIOR AIR EXHAUST

CROSS REFERENCE TO RELATED APPLICATIONS

This application is a U.S. National Stage Entry of International Patent Application Serial Number PCT/EP2020/050274, filed Jan. 8, 2020, which claims priority to German Patent Application No. DE 10 2019 200 700.7, filed Jan. 21, 2019, the entire contents of both of which are incorporated herein by reference.

FIELD

The present disclosure generally relates to exhaust air scrubbers, including exhaust air scrubbers for ammonium nitrate, calcium ammonium nitrate, or low density ammonium nitrate (LDAN) plants.

BACKGROUND

In the production of fertilizers and other nitrogen-based products, especially with granulation and prilling processes, large amounts of air are used for drying and cooling of the solid. The dust and abraded product generated in the mechanical processes is discharged by this process air and requires reseparation and downstream process steps to prevent contamination of people and the environment as well as product losses. Furthermore, the drying of fertilizers often also releases ammonia. This gas must also be removed from the exhaust air before it leaves plant limits. It has been found that (in the case of products containing ammonium nitrate) acidic wet scrubbing is the most effective method for exhaust air cleaning: the dust is wetted by the scrubbing liquid; the water-soluble components (ammonium nitrate) dissolve, while the insoluble ones (for example additions such as filler, additives) are suspended. The ammonia gas is also dissolved in the washing liquid and then neutralized by the free acid to form an ammonia salt. The air washed in this way contains only small added amounts of dust and ammonia. If nitric acid is used as the acidifying agent the scrubbed out ammonia forms ammonium nitrate which may be recycled into the production process as a value product. To increase the contact area between process air to be cleaned and scrubbing solution a packing is employed (typically a loose random packing which is easy to install and less susceptible to blockages through solids). The objective of the scrubbing solution is ensured by liquid distributor systems above the packing. Recirculation pumps return the scrubbing liquid from the bottom of the scrubber back to the liquid distribution above the packing. To prevent entrainment of droplets of the scrubbing liquid into the exhaust air duct it is customary to employ a droplet separator.

Plants for producing AN/CAN/LDAN (plants for producing ammonium nitrate, calcium ammonium nitrate or low-density ammonium nitrate) are known. These plants typically employ wet scrubbers with packings for the purification of dust-laden and ammonia-containing offgases. These scrubbers are generally round with diameters of up to more than 6 m and heights of about 20 m. The air supply is below the packing and the cleaned air is withdrawn at the top of the scrubber. In such plants the respective downstream fan is for various reasons generally installed on the ground so that the air duct outside the scrubber must be returned to the ground. Since these ducts have a diameter of up to more than 2000 mm they must be protected by steelwork and thermal expansion must be compensated. This is complex and costly.

Corresponding plants where the exhaust air is passed out of the top of the housing are known for example from JP 2012/187515 or U.S. Pat. No. 4,487,748. Prior art that may be mentioned also includes GB 794 060 A or DE 10 2008 046 820 A1.

However, the operation/construction of such plants faces a number of challenges.

Since large amounts of warm, dry air are scrubbed and therefore enriched with water it is constantly necessary to add water to the scrubber. The concentration of the scrubbing solution must be monitored and limited in order to prevent supersaturation of the solution with ammonium nitrate. Otherwise the packing would become blocked, the air stream become impeded, pressure drop and flow rate increase and the cleaning performance of the scrubber decrease. Since the separated dust also contains scrubbing liquid-insoluble constituents, sludge collects at the bottom of the scrubber in the course of operation. This sludge causes problems in the recirculation pumps and desludging valves. The pH of the scrubbing liquid requires continuous measurement and readjustment by addition of acid in order to ensure both optimal ammonia separation and material-friendly operation. The air withdrawal at the top of the scrubbing column entails a relatively high complexity of pipelines and pipeline mounting as a consequence of the large pipe diameter. The often very large diameter of the scrubber requires complex support structures for the supporting grids of the packing, the packing hold-downs and the liquid distributors.

Thus a need exists to find ways to improve existing plants, exhaust air scrubbers and processes such that apparatus complexity and monetary cost are significantly reduced and the further operational disadvantages and difficulties can be reduced.

BRIEF DESCRIPTION OF THE FIGURE

FIG. 1 is a schematic view of an example exhaust air scrubber of the present disclosure.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In one embodiment the present invention relates to an exhaust air scrubber for removing dust, abraded product and water-soluble constituents from process exhaust air comprising in one housing at least one cleaning stage, at least one packing, optionally at least one scrubbing tray, at least one inlet apparatus for process exhaust air, at least one withdrawal apparatus for scrubbing solution, at least one withdrawal conduit for the cleaned exhaust air, at least one feed conduit for scrubbing solution in the upper portion of the housing.

The exhaust air scrubbers according to the invention have the feature that the withdrawal conduit for the cleaned exhaust air
i) begins inside the housing above the at least one cleaning stage,
ii) is passed downward inside the housing and
iii) is passed out of the housing to the outside in the lower region of the housing below the cleaning stage(s).

In a further embodiment the present invention relates to a process for exhaust air cleaning in the production of or in plants for producing ammonium nitrate- or urea-containing prilled or granulated product, preferably ammonium nitrate fertilizer (HDAN), porous ammonium nitrate (LDAN), calcium ammonium nitrate (CAN), ammonium sulfate nitrate fertilizer (ASN) or urea fertilizer, characterized in that an exhaust air scrubber according to the invention is employed.

In yet a further embodiment the present invention relates to a plant for producing ammonium nitrate- or urea-containing prilled or granulated product, preferably ammonium nitrate fertilizer (HDAN), porous ammonium nitrate (LDAN), calcium ammonium nitrate (CAN), ammonium sulfate nitrate fertilizer (ASN) or urea fertilizer which comprises at least one exhaust air scrubber according to the invention.

In another embodiment the present invention relates to the use of exhaust air scrubbers according to the invention for offgas cleaning in the production of ammonium nitrate- or urea-containing prilled or granulated product, preferably ammonium nitrate fertilizer (HDAN), porous ammonium nitrate (LDAN), calcium ammonium nitrate (CAN), ammonium sulfate nitrate fertilizer (ASN) or urea fertilizer.

In embodiments of the present invention an aqueous solution is employed as scrubbing liquid. In embodiments this may be withdrawn from the bottom of the scrubber and fed back via the scrubbing stage(s) in recirculating fashion.

In embodiments this solution may contain dissolved or suspended substances scrubbed out of the air stream or formed from scrubbed out substances in a chemical reaction. These substances may be for example ammonium nitrate, calcium carbonate, urea, ammonia, nitric acid or sulfuric acid. To produce a chemical equilibrium it is preferable when a portion of the scrubbing solution is continuously withdrawn from the circuit and the water removed thus and by water evaporation is added by addition of a suitable aqueous feed, preferably purified water, steam or process condensate.

In the exhaust air scrubbers of the present invention the purified air stream is already conducted downwards inside the scrubber and exits the housing below the packings, preferably approximately at the height of the fan feed by which the cleaned exhaust air is discharged from the housing.

The necessary scrubber diameter hardly changes as a result of the design according to the invention. In addition, the ring geometry simplifies the distribution of the scrubbing water over the packings. The complexity and time required for the installation and pre-installation of the system is also reduced.

Suitable packings include especially random packings, but in principle also any other packings familiar to those skilled in the art. One example of packings employable in the context of the present invention are customary random packings or structured packings, preferably complex-shaped plastic random packings such as for example those marketed under the trade names Snowflakes®, Tellerette® or Q-Pac®.

In further embodiments of the present invention scrubbing trays may be included in the exhaust air scrubber according to the invention between the packing and the droplet separator in order to further increase separation efficiency. Employable scrubbing trays in the context of the present invention include scrubbing trays familiar to those skilled in the art, for example bubble trays, valve trays or tunnel trays.

An essential aspect of the present invention is the internal air outlet conduit in the exhaust air scrubber.

Advantages of the present invention include inter alia a compact design, relatively small basic dimensions for erection, savings for external air ducts and optionally steelwork, savings in the installation of the air duct etc.

As a result of these advantages, financial savings may be realized with the present invention. The exhaust air scrubbers according to the invention also endow the plants with a markedly reduced apparatus complexity, thus making them more advantageous than previous plants.

If the exhaust air is to be withdrawn from the scrubber of the present invention with more than one fan, the air outlet duct may already be divided inside the scrubber and passed to the fans through a plurality of housing feedthroughs. This saves further costs compared to a conventional external air flow division.

The fact that the cleaned exhaust air stream is not externally withdrawn axially at the tip of the scrubbing column and passed through an external pipeline to the scrubber blower but rather is conducted back downwards inside the scrubber and exits laterally has several advantages:
the mass of employed pipeline material and associated supports (balance space between scrubber and scrubber blower) is markedly reduced,
the assembly complexity during installation is significantly reduced,
the internal pipe may simultaneously serve as an anchoring point for the (many) internal carriers for securing the packing and the liquid distribution systems.

In preferred embodiments of the present invention the exhaust air scrubber according to the invention is configured such that its lower portion is conical with its tip facing downwards; this forms a conical sump of the scrubber with a central drain to the recirculation pumps. This enables very uniform sludge withdrawal.

Tangential injection of a substream of the circulated scrubbing solution into the conical sump makes it possible to yet further reduce the deposition of solids. This stream is also ideally suitable for assessing the properties of the scrubbing solution, such as for example temperature, density, concentration and pH since the low volume flow means that only measurement instruments having a small pipe cross section are required. A corresponding tangential injection/an exhaust air scrubber having an apparatus for tangential injection are therefore preferred embodiments.

In the context of the present invention it is moreover possible in further embodiments to configure the exhaust air scrubber according to the invention such that it may contain one or more cleaning stages which may be operated with identical or different inputs and identical or different process conditions.

The present invention also makes it possible to further increase the water evaporation performance of the scrubber in order to remove suitable excess process wastewaters from a plant complex in relatively convenient fashion. This is preferably effected by heating the recirculating scrubbing solution in an external heat exchanger which may for example be heated by low-calorific process media and which may alternatively even be cooled with cooling water. One exemplary application is the condensation of process vapors from an upstream ammonium nitrate evaporative concentration by using the recirculating scrubbing solution as cooling medium. The energy input is transferred from the scrubbing solution to the scrubbing air and brings about a temperature increase in the cleaned air which thus results in a higher water loading.

In further embodiments of the present invention nozzles which allow water or other substances, such as especially acid, to be sprayed onto the separator may be attached upstream of the droplet separator. Any accumulation of ammonium nitrate-containing solid deposits may thus easily be cleaned off again since ammonium nitrate and urea are very soluble in water. Deposits that are not soluble in water may be dissolved by addition of acid (for example nitric acid).

In further embodiments of the present invention a heat exchanger package can be inserted into the internal air withdrawal duct. To this end the duct may be altered in size and shape in order to be able to receive the heat exchanger package, for example composed of tubes, heat exchanger plates or spiral tubes, in a flow-efficient manner. Air thus heated after water absorption in the scrubber has a reduced relative humidity and therefore results in a weather dependent low visibility of the water vapor cloud from the exhaust air chimney. Air further cooled therein contains a lower absolute water loading and may be employed for a subsequent use without a further external air cooler.

In further embodiments of the present invention the exhaust air scrubber according to the invention may be a multi-stage scrubber, wherein each of the individual scrubbing stages may be operated with individual scrubbing liquids, additions and conditions such as for example pH, concentration or temperature.

It is further possible to install a plurality of exhaust air scrubbers according to the invention in one plant; for example a plurality of exhaust air scrubbers according to the invention may be connected/arranged in series or parallel.

It is preferable in the context of the present invention when the exhaust air scrubber has a circular surface and the air extraction apparatus, i.e. the withdrawal conduit for the cleaned exhaust air beginning above the at least one cleaning stage, is arranged centrally and in the middle, in particular concentrically.

In further preferred embodiments of the present invention the air extraction apparatus is a pipe or a pipe bundle.

In particular embodiments the first scrubbing stage in the flow direction of the air may be operated at a neutral or alkaline pH to scrub dust out of the air without chemically altering the dust (for instance through attack by acid which can result in the formation of undesired/disadvantageous byproducts). In the second stage this may be followed for example by an acid scrubbing of the previously dedusted air in order to scrub out gases. In variants of the present invention the desludging from the second stage may be used as feed liquid for the first stage.

In the context of the present invention the contaminated process exhaust air is thus initially passed through a packing, then optionally through a scrubbing tray and then through a droplet separator before entering the withdrawal conduit for the cleaned exhaust air.

The present invention inter alia also provides the following embodiments designated with Roman numerals:

Embodiment I An exhaust air scrubber for removing dust, abraded product and water-soluble constituents from process exhaust air comprising in one housing
I) at least one cleaning stage comprising
a) a droplet separator, preferably in the form of a knitted mesh or lamellar separator,
b) arranged therebelow at least one packing, preferably in the form of a random packing,
c) optionally between the droplet separator and the packing at least one scrubbing tray,
II) at least one inlet apparatus for process exhaust air arranged in the lower portion of the housing, preferably below the at least one cleaning stage,
III) at least one withdrawal apparatus for scrubbing solution which may also contain solids, preferably at the lower end of the housing,
IV) at least one withdrawal conduit for the cleaned exhaust air
V) at least one feed conduit for scrubbing solution in the upper portion of the housing, above the at least one cleaning stage,
characterized in that
the withdrawal conduit for the cleaned exhaust air
i) begins inside the housing above the at least one cleaning stage,
ii) is passed downward inside the housing and
iii) III is passed out of the housing to the outside in the lower region of the housing below the cleaning stage(s).

Embodiment II The exhaust air scrubber as claimed in embodiment I, characterized in that
at the lower end the housing narrows in the downward direction and is preferably conical and
the at least one withdrawal apparatus for scrubbing solution is arranged at the lower end of the housing.

Embodiment IIIa The exhaust air scrubber as claimed in embodiment II, characterized in that the lower narrowing end is used as a sump at least partially filled with scrubbing liquid or in that the scrubbing liquid is alternatively collected and held in a separate container below the scrubber.

Embodiment IIIb The exhaust air scrubber as claimed in embodiment II, characterized in that the at least one withdrawal apparatus for scrubbing solution is arranged at the lowest point in the center of the housing narrowing and is optionally connected to at least one recirculation pump for scrubbing solution withdrawal.

Embodiment IV The exhaust air scrubber as claimed in any of the preceding embodiments, characterized in that the withdrawal conduit is arranged in the middle of the housing, preferably concentrically to the circular side walls of the housing.

Embodiment V The exhaust air scrubber as claimed in any of the preceding embodiments, characterized in that the withdrawal conduit for the cleaned exhaust air is passed laterally outwards out of the housing in the lower portion of the housing below the cleaning stage(s).

Embodiment VI The exhaust air scrubber as claimed in any of the preceding embodiments, characterized in that the withdrawal conduit inside the housing is simultaneously configured as an anchoring point for internal attachments, preferably including an anchoring point for the elements of the cleaning stage(s).

Embodiment VII The exhaust air scrubber as claimed in any of the preceding embodiments, characterized in that the withdrawal conduit inside the housing is connected to at least one suction apparatus and/or at least one exhaust air blower optionally via additional conduits.

Embodiment VIII The exhaust air scrubber as claimed in any of the preceding embodiments, characterized in that a portion of the scrubbing solution withdrawn at the bottom or another suitable process medium, for example the feed water or process condensate generated elsewhere, is injected into the conical lower portion of the housing, preferably tangentially.

Embodiment IX The exhaust air scrubber as claimed in any of the preceding embodiments, characterized in that an apparatus for heating the scrubbing solution to be introduced into the housing is arranged outside the housing, preferably in the form of a heat exchanger arranged at the feed conduit for the scrubbing solution.

Embodiment X The exhaust air scrubber as claimed in any of the preceding embodiments, characterized in that it comprises an apparatus for measuring physical parameters of material accumulating in the lower portion of the housing, preferably comprising apparatuses for measuring the pH and the concentration of the scrubbing solution and the fill level in the exhaust air scrubber.

Embodiment XIX The exhaust air scrubber as claimed in any of the preceding embodiments, characterized in that it comprises a control apparatus with which the supplied amount of process exhaust air is controlled, preferably via a level- and concentration-controlled post-addition.

Embodiment XII The exhaust air scrubber as claimed in any of the preceding embodiments, characterized in that nozzles configured for spraying water onto the droplet separator are attached upstream of the droplet separator.

Embodiment XIII The exhaust air scrubber as claimed in any of the preceding embodiments, characterized in that at least one heat exchanger or heat exchanger package is installed downstream of the uppermost cleaning stage.

Embodiment XIV The exhaust air scrubber as claimed in any of the preceding embodiments, characterized in that a manually or automatically controlled gas or air supplying means, preferably controlled on the basis of temperature or weather or visual parameters, is arranged downstream of the uppermost cleaning stage, preferably configured for introducing gas or air into the internal exhaust air conduit/the internal portion of the exhaust air conduit.

Embodiment XV The exhaust air scrubber as claimed in any of the preceding embodiments, characterized in that in the case of a plurality of cleaning stages for the individual cleaning stages
A) each cleaning stage has its own independent feed and control apparatuses for the scrubbing liquids, additions and/or operating parameters to be used in the cleaning stage, or
B) some but not all cleaning stages have common feed and control apparatuses for the scrubbing liquids, additions and/or operating parameters to be used in the cleaning stage, or
C) all cleaning stages have common feed and control apparatuses for the scrubbing liquids, additions and/or operating parameters to be used in the cleaning stages.

Embodiment XVI The exhaust air scrubber as claimed in any of the preceding embodiments, characterized in that two cleaning stages are arranged in series, wherein
1) the first cleaning stage in the flow direction of the air is configured for alkaline and neutral, preferably uncontrolled pH, operation and
2) the second cleaning stage is configured for acidic pH operation.

Embodiment XVII The exhaust air scrubber as claimed in any of the preceding embodiments, characterized in that the scrubbing solution withdrawn at the bottom is in whole or in part passed to the feed point in the upper portion of the housing, preferably using a pump.

Embodiment XVIII The exhaust air scrubber as claimed in any of the preceding embodiments, characterized in that at least a substream of the previously pre-cleaned air passes through a further cleaning stage.

Embodiment XIX The exhaust air scrubber as claimed in any of the preceding embodiments, characterized in that at least one cleaning stage may be pH-adjusted by addition of a mineral acid, preferably nitric or sulfuric acid.

Embodiment XX The exhaust air scrubber as claimed in any of the preceding embodiments, characterized in that it is configured as part of a plant for producing ammonium nitrate- or urea-containing prilled or granulated product, preferably ammonium nitrate fertilizer (HDAN), porous ammonium nitrate (LDAN), calcium ammonium nitrate (CAN), ammonium sulfate nitrate fertilizer (ASN) or urea fertilizer.

Embodiment XXI A process for exhaust air cleaning in the production of or in plants for producing ammonium nitrate- or urea-containing prilled or granulated product, preferably ammonium nitrate fertilizer (HDAN), porous ammonium nitrate (LDAN), calcium ammonium nitrate (CAN), ammonium sulfate nitrate fertilizer (ASN) or urea fertilizer, characterized in that an exhaust air scrubber according to any of embodiments I to XX is employed.

Embodiment XXII A plant for producing ammonium nitrate- or urea-containing prilled or granulated product, preferably ammonium nitrate fertilizer (HDAN), porous ammonium nitrate (LDAN), calcium ammonium nitrate (CAN), ammonium sulfate nitrate fertilizer (ASN) or urea fertilizer, characterized in that the plant comprises an exhaust air scrubber according to any of embodiments I to XX.

Embodiment XXIII The use of an exhaust air scrubber as claimed in any of embodiments I to XX for offgas cleaning in the production of ammonium nitrate- or urea-containing prilled or granulated product, preferably ammonium nitrate fertilizer (HDAN), porous ammonium nitrate (LDAN), calcium ammonium nitrate (CAN), ammonium sulfate nitrate fertilizer (ASN) or urea fertilizer.

The various configurations, embodiments and variants of the present invention, for example, but not restricted thereto, of the various claims, can be combined with one another in any way unless such combinations are contradictory.

The present invention is hereinbelow more particularly elucidated with reference to the drawing. The drawing is not to be interpreted as limiting and is not to scale. The drawing moreover does not contain all of the features comprised by customary plants but rather is reduced to the present invention and features essential to the understanding thereof.

The process exhaust air 3 to be cleaned is passed into the housing Oa of the exhaust air scrubber 0 via a feed conduit. Simultaneously the cleaned exhaust air is withdrawn elsewhere on the exhaust air scrubber 0 via the exhaust air blower 7. As a result of the thus produced pressure difference, the process exhaust air 3 introduced into the exhaust air scrubber 0 is conveyed through the packing 2 or packings of an optionally present scrubbing tray 9, shown here in the drawing, and via a droplet separator 1 into the upper region of the exhaust air scrubber 0. The process exhaust air 3 is cleaned by a countercurrent of an aqueous scrubbing solution. The thus cleaned process exhaust air then in the upper region of the exhaust air scrubber 0 enters the centrally arranged withdrawal conduit 13, preferably in the form of a pipe, for the exhaust air 8 and is conveyed out of the exhaust air scrubber 0 and discharged as cleaned exhaust air via the exhaust air blower 7. The conveying of the air may alternatively also be effected via a blower arranged upstream of the exhaust air scrubber 0. The scrubbing solution 11 which may preferably be an aqueous solution of the scrubbed out substances and which is introduced above the scrubbing stage 2 in the upper region of the exhaust air scrubber 0 flows in conformance with the gravitational force and in countercurrent to the process exhaust air 3 to be cleaned through the scrubbing tray 9 and the packing 3 downward into the lower region of the exhaust air scrubber 0. Supplying of the scrubbing solution 11 into the scrubber is effected for example via customary liquid distributors, for example pipe or trough distributors. The figure shows a preferred embodiment of the present invention in which the lower region of the exhaust air scrubber 0 is here shown as conical though this is not mandatory for the present invention. The scrubbing stage 2 may also consist of a plurality of scrubbing stages each having assigned scrubbing water circuits. Arranged at the lower end of the exhaust air scrubber 0, at the tip of the conical portion in the drawing, is a withdrawal apparatus 4 for the scrubbing solution. The scrubbing solution is withdrawn from the lower region of the exhaust air scrubber 0 and recycled back to the upper portion of the exhaust air scrubber 0 via the recirculation pump 5. In contrast to FIG. 1 the scrubbing solution may also flow from the bottom of the scrubber into a separate container and from there be supplied to the recirculation pump 5. FIG. 1 shows a reintroduction of the supplied, recirculated scrubbing solution 11 between the packing 2 and the scrubbing tray 9 but it is likewise possible to introduce the recirculated scrubbing solution inside the packing region. The figure thus shows in simplified form that the recirculated scrubbing solution 11 is recycled into the exhaust air scrubber 0 at one site; however it is likewise possible and comprised by the present invention that the scrubbing solution may be passed into the housing Oa of the exhaust air scrubber 0 at a plurality of sites. The drawing further shows that the scrubbing liquid withdrawn from the exhaust air scrubber 0 at the lower end can be cleaned of accumulating impurities via a desludging 6. In the context of the present invention this desludging/cleaning of the scrubbing liquid is carried out according to the extent of contamination of the scrubbing liquid and thus also according to the extent of contamination of the supplied process exhaust air 3. The drawing shows an addition of feed water 10 which is supplied to the recirculated scrubbing solution 11. This water feed may also be effected at another site, for example directly into the scrubber or upstream of the recirculation pump 5. The figure shows water additions 14a for rinsing the droplet separator 1 and 14b for an optionally used scrubbing tray. These water additions may have the same origin as the feed water 10 but may also derive from various other systems. In the drawing stream 12 shows by way of example a scrubbing solution stream preferably tangentially introduced into the narrowing lower scrubber portion. However, this stream 12 may also employ a different medium, for example the feed water 10. In the drawing stream 15 shows the addition of a mineral acid for scavenging ammonia from the air 3 to be cleaned. This addition may for example also be carried out upstream of the recirculation pump 5 or directly into the exhaust air scrubber 0. Measurement of the pH necessary for the control may be carried out upstream or downstream of the acid addition. In the drawing the portion 13 of the withdrawal conduit for the exhaust air 8 that is inside the housing 0a is shown arranged in the middle and centrally in the housing 0a of the exhaust air scrubber 0 and the outlet of the withdrawal conduit for the exhaust air 8 out of the housing 0a is shown opposite the inlet for the process exhaust air 3 into the housing 0a of the exhaust air scrubber 0 at about the same height of the housing 0a. This represents a preferred embodiment of the present invention. It is not mandatory for the portion 13 of the withdrawal conduit for the exhaust air 8 that is inside the housing 0a to be arranged precisely in the middle of the exhaust air scrubber 0 but it is advantageous. It is likewise possible in the context of the present invention for the withdrawal conduit for the exhaust air 8 to exit the housing 0a at another site.

It should be noted that the drawing is not to scale and is moreover a simplified representation. Customary apparatus details/necessities not necessary for the understanding of the present invention and familiar to those skilled in the art have been omitted (for example screws, valves or the like).

LIST OF REFERENCE NUMERALS

0 Exhaust air scrubber
0a Housing
1 Droplet separator
2 Packing
3 Process air to be cleaned
4 Withdrawal apparatus (for scrubbing solution)
5 Recirculation pump
6 Desludging
7 Exhaust air blower
8 Withdrawal conduit (for cleaned exhaust air)
9 Scrubbing tray
10 Water addition (for example water, process condensate, diluted process solution)
11 Recirculating scrubbing solution
12 Injected scrubbing solution
13 Internal portion of air withdrawal conduit
14a, b Water addition to droplet separator/scrubbing tray
15 Mineral acid (for example nitric acid, sulfuric acid)
A Flow direction of the scrubbing solution
B Flow direction of the air

What is claimed is:

1. An exhaust air scrubber for removing dust, abraded product, and water-soluble constituents from process exhaust air, the exhaust air scrubber comprising in a single housing:
　a cleaning stage that includes
　　a droplet separator, and
　　a packing disposed below the droplet separator;
　an inlet apparatus for process exhaust air disposed in a lower portion of the housing;
　a withdrawal apparatus for scrubbing solution;
　a withdrawal conduit for cleaned exhaust air, wherein the withdrawal conduit begins inside the housing above the cleaning stage, passes downward inside the housing, and passes out of the housing to an outside in the lower portion of the housing below the cleaning stage, wherein the withdrawal conduit is a single pathway without branches; and
　a feed conduit for scrubbing solution in an upper portion of the housing above the cleaning stage.

2. The exhaust air scrubber of claim 1 wherein the lower portion of the housing narrows, wherein the withdrawal apparatus is disposed at the lower portion of the housing.

3. The exhaust air scrubber of claim 2 wherein the withdrawal apparatus is disposed at a lowest point in a center of the housing where the housing narrows.

4. The exhaust air scrubber of claim 1 wherein the withdrawal conduit is disposed in a middle of the housing.

5. The exhaust air scrubber of claim 1 wherein the withdrawal conduit passes laterally outwards out of the housing in the lower portion of the housing below the cleaning stage.

6. The exhaust air scrubber of claim 1 wherein the withdrawal conduit inside the housing is configured as an anchoring point for internal attachments.

7. The exhaust air scrubber of claim 1 wherein the withdrawal conduit inside the housing is connected to at least one of a suction apparatus or an exhaust air blower via one or more conduits.

8. The exhaust air scrubber of claim 1 configured such that a portion of scrubbing solution or process medium withdrawn at a bottom is injected into a conical lower portion of the housing.

9. The exhaust air scrubber of claim 1 comprising an apparatus for measuring physical parameters of material that accumulates in the lower portion of the housing.

10. The exhaust air scrubber of claim 1 comprising nozzles that are attached upstream of the droplet separator for spraying water onto the droplet separator.

11. The exhaust air scrubber of claim 1 comprising a heat exchanger installed downstream of the cleaning stage.

12. The exhaust air scrubber of claim 1 comprising gas- or air-supplying means disposed downstream of the cleaning stage.

13. The exhaust air scrubber of claim 1 wherein the cleaning stage is a first cleaning stage, wherein the exhaust air scrubber includes a second cleaning stage and a third cleaning stage, wherein:
    each of the cleaning stages has independent feed and control apparatuses for scrubbing liquids, additions, and/or operating parameters to be used in respective cleaning stages; or
    the first and second cleaning stages, but not the third cleaning stage, have common feed and control apparatuses for scrubbing liquids, additions, and/or operating parameters to be used in the respective cleaning stages; or
    all of the cleaning stages have common feed and control apparatuses for scrubbing liquids, additions, and/or operating parameters to be used in the respective cleaning stages.

14. The exhaust air scrubber of claim 1 wherein the cleaning stage is a first cleaning stage, wherein the exhaust air scrubber includes a second cleaning stage, wherein the first and second cleaning stages are arranged in series, wherein the first cleaning stage in a flow direction of air is configured for alkaline and neutral operation, wherein the second cleaning stage is configured for acidic pH operation.

15. The exhaust air scrubber of claim 1 configured such that scrubbing solution withdrawn at a bottom is at least partially passed to the feed conduit in the upper portion of the housing.

16. The exhaust air scrubber of claim 1 configured such that at least a substream of previously-pre-cleaned air passes through a second cleaning stage.

17. The exhaust air scrubber of claim 1 wherein the cleaning stage is configured to receive a mineral acid in order to adjust a pH level.

18. The exhaust air scrubber of claim 1 wherein the exhaust air scrubber is part of a plant for producing ammonium nitrate- or urea-containing prilled or granulated product.

19. An exhaust air scrubber for removing dust, abraded product, and water-soluble constituents from process exhaust air, the exhaust air scrubber comprising in a single housing:
    at least a top cleaning stage and a bottom cleaning stage, each of the cleaning stages including:
        a droplet separator, and
        a packing disposed below the droplet separator;
    an inlet apparatus for process exhaust air disposed in a lower portion of the housing;
    a withdrawal apparatus for scrubbing solution;
    a withdrawal conduit for cleaned exhaust air, wherein the withdrawal conduit begins inside the housing above the top cleaning stage, passes downward inside the housing, and passes out of the housing to an outside in the lower portion of the housing below the bottom cleaning stage; and
    a feed conduit for scrubbing solution in an upper portion of the housing above the top cleaning stage.

* * * * *